United States Patent
El Assaad et al.

(10) Patent No.: US 11,765,753 B2
(45) Date of Patent: *Sep. 19, 2023

(54) APPARATUS, METHOD AND COMPUTER PROGRAM FOR DETERMINING A DUPLEX RESOURCE SCHEME FOR A LOCALIZED COMMUNICATION IN A MOBILE COMMUNICATION SYSTEM

(71) Applicant: Volkswagen Aktiengesellschaft, Wolfsburg (DE)

(72) Inventors: Ahmad El Assaad, Wolfsburg (DE); Ernst Zielinski, Bochum (DE); Joakim Cervall, Stockholm (SE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 169 days.

This patent is subject to a terminal disclaimer.

(21) Appl. No.: 16/809,626

(22) Filed: Mar. 5, 2020

(65) Prior Publication Data
US 2020/0288477 A1    Sep. 10, 2020

(30) Foreign Application Priority Data

Mar. 8, 2019 (EP) ..................................... 19161682

(51) Int. Cl.
*H04W 72/52* (2023.01)
*H04W 4/40* (2018.01)
*H04L 5/14* (2006.01)

(52) U.S. Cl.
CPC .............. *H04W 72/52* (2023.01); *H04L 5/14* (2013.01); *H04W 4/40* (2018.02)

(58) Field of Classification Search
CPC ........... H04W 72/0486; H04W 72/048; H04W 16/18; H04W 24/02; H04W 28/16;
(Continued)

(56) References Cited

U.S. PATENT DOCUMENTS

2014/0233472 A1    8/2014   Kadel
2015/0094878 A1    4/2015   Miura et al.
(Continued)

FOREIGN PATENT DOCUMENTS

CN          1536793 A       1/2004
CN        104350778 A       2/2015
(Continued)

OTHER PUBLICATIONS

NTT Docomo Inc., R1-1900965, Sidelink resource allocation mechanism for NR V2X, 3GPP RSG RAN WG1 #AH (Jan. 11, 2019, 3GPP server publicized).

*Primary Examiner* — Jackie Zuniga Abad
*Assistant Examiner* — Sun Jong Kim
(74) *Attorney, Agent, or Firm* — 2SPL Patentanwälte PartG mbB; Yong Beom Hwang

(57) ABSTRACT

An apparatus, a method and a computer program for determining a duplex resource scheme for a localized communication in a mobile communication system. The method for determining a duplex resource scheme for a localized communication in a mobile communication system comprises obtaining information related to a plurality of planned maneuvers of a plurality of road users, wherein the plurality of planned maneuvers are related to an intersection. The method comprises predicting a plurality of radio resources required for a communication of the plurality of road users at the intersection based on the obtained information related to the plurality of planned maneuvers. The method further comprises determining the duplex resource scheme based on the predicted plurality of radio resources required for the communication of the plurality of road users at the intersection.

16 Claims, 3 Drawing Sheets

(58) Field of Classification Search
CPC ... H04W 4/40; H04W 72/0493; H04W 72/02; H04B 17/382; H04B 7/2621; H04B 7/2628; H04B 7/2643; H04L 5/14
See application file for complete search history.

(56) References Cited

U.S. PATENT DOCUMENTS

| | | | |
|---|---|---|---|
| 2017/0291608 A1* | 10/2017 | Engel | G08G 1/096741 |
| 2018/0063261 A1* | 3/2018 | Moghe | H04W 36/0083 |
| 2019/0026918 A1* | 1/2019 | Gomezcaballero | H04N 13/204 |
| 2019/0045397 A1* | 2/2019 | Mueck | H04W 88/06 |
| 2019/0116586 A1* | 4/2019 | Basu Mallick | H04W 64/00 |
| 2020/0154426 A1* | 5/2020 | Tak CS | H04W 4/40 |
| 2020/0242922 A1* | 7/2020 | Dulberg | G08G 1/164 |
| 2020/0287700 A1* | 9/2020 | El Assaad | H04W 72/042 |

FOREIGN PATENT DOCUMENTS

| | | |
|---|---|---|
| CN | 106408979 A | 2/2017 |
| EP | 2150081 A2 | 2/2010 |
| EP | 2175585 A1 | 4/2010 |
| EP | 3174341 A1 | 12/2010 |
| IN | 201847035386 A | 9/2018 |
| JP | 2009059039 A | 3/2009 |
| KR | 2017-0057835 | 5/2017 |
| KR | 2017-0138874 | 12/2017 |
| WO | 2018195503 A1 | 4/2018 |
| WO | 2018204264 A1 | 4/2018 |
| WO | 2018215833 A1 | 11/2018 |
| WO | 2019012308 A1 | 1/2019 |

\* cited by examiner

APPARATUS, METHOD AND COMPUTER PROGRAM FOR DETERMINING A DUPLEX RESOURCE SCHEME FOR A LOCALIZED COMMUNICATION IN A MOBILE COMMUNICATION SYSTEM

CROSS-REFERENCE TO RELATED APPLICATION

This application claims priority to European Application 19161682.0, filed on Mar. 3, 2019. The contents of the earlier filed application is incorporated by reference herein in its entirety.

SUMMARY

The present invention relates to an apparatus, a method and a computer program for determining a duplex resource scheme for a localized communication in a mobile communication system, and to a method for a vehicle, which uses the determined resource scheme for the localized communication in the mobile communication system.

Vehicular communication is a field of research and development. To enable an autonomous or semi-autonomous driving of the vehicles, vehicles are expected to use Vehicle-to-Vehicle-Communication (V2V) and Vehicle-to-Network (V2N) communication, e.g. to coordinate driving maneuvers and/or to receive tele-operated driving instructions. This communication is generally wireless, i.e. vehicles may wirelessly communicate with other vehicles in their vicinity and/or with backend services via cellular mobile communication systems.

International patent application WO 2018/195503 A1 discloses an apparatus, system and method for utilizing a flexible slot format indicator. The flexible slot format indicator may e.g. be used in conjunction with dynamic Time Division Duplex (dynamic TDD).

International patent application WO 2018/204264 A1 discloses techniques and apparatuses for a priority-based resource configuration.

European patent application EP 3174341 A1 discloses methods and nodes for setting values of system parameters used in a wireless communication system.

As wireless communication occurs over a shared medium, which may be limited by the availability of radio resources, there may be a desire to provide an improved concept for radio resource management in vehicular communication.

Embodiments are based on the finding that, at an intersection, a communication between various road users (i.e. vehicles, such as cars, motorbikes or bicycles, or pedestrians) may be desired or required to enable a smooth coordination of the road users and a safe passage of the road users at the intersection. This communication between the road users may follow certain previously known patterns: If, for example, a vehicle uses a tele-operated driving service, the service may require a certain amount of downlink and uplink communication to work reliably. If vehicles communicate to determine, which of the vehicles is to enter the intersection first, the communication may require a certain amount of side-link communication to work reliably. Consequently, if an entity is equipped with information related to planned maneuvers of a plurality of road users at an intersection, this entity may be configured to predict the communication of the plurality of road users (e.g. among the plurality of road users using V2V communication or with a network using V2N communication), and the radio resources that are required for that communication. Based on the radio resources required for the communication of the plurality of road users at the intersection, a duplex resource scheme, such as a dynamic Time Division Duplex (dynamic TDD), may be adapted, so sufficient radio resources are available for the predicted communication.

Embodiments provide a method for determining a duplex resource scheme for a localized communication in a mobile communication system. The method comprises obtaining information related to a plurality of planned maneuvers of a plurality of road users. The plurality of planned maneuvers are related to an intersection. The method further comprises predicting a plurality of radio resources required for a communication of the plurality of road users at the intersection based on the obtained information related to the plurality of planned maneuvers. The method further comprises determining the duplex resource scheme based on the predicted plurality of radio resources required for the communication of the plurality of road users at the intersection. By providing the information related to the plurality of planned maneuvers of the plurality of road users at the intersection, communication links between the plurality of road users and between the plurality of road users and a network may be predicted. Accordingly, the radio resources required for the communication links may be estimated. These estimated radio resources may be used to adjust the duplex resource scheme, e.g. to allocate sufficient radio resources for the respective shares of downlink, uplink and side-link communication.

In at least some examples, the duplex resource scheme comprises a dynamic time-division duplex resource scheme. The dynamic TDD resource scheme may be adapted to shift radio resources between uplink, downlink and side-link communication, e.g. to accommodate the predicted communication.

Alternatively or additionally, the duplex resource scheme comprises at least one of a frequency-division duplex (FDD) resource scheme, a code duplex resource scheme, and a spatial resource scheme. By adding more flexibility in the resources that are part of the duplex resource scheme, a higher flexibility in the allocation of the radio resources may be reached.

The duplex resources may be allotted between at least two of uplink communication, downlink communication, and side-link communication within the duplex resource scheme. In vehicular communication, different traffic situations may lead to different traffic patterns. For example, in inter-cluster communication, side-link communication may be used primarily, while uplink and downlink communication may be required for tele-operated driving.

In at least some embodiments, the method further comprises obtaining environmental perception data related to the plurality of road users. The plurality of radio resources required for a communication of the plurality of road users at the intersection may be predicted based on the environmental perception data related to the plurality of road users. This may enable an improved accuracy in the prediction of the communication links between the road users and/or between the road users and the network, and consequently an improved accuracy in the prediction of the radio resources required for the communication links.

For example, the environmental perception data may comprise modeling information for an area surrounding the plurality of road users, e.g. an area surrounding the intersection. The modeling information may relate to objects that have been identified by a road user executing the method or by the plurality of road users, using one or more perception sensors of the road user or of the plurality of road users. The environmental perception data may provide a high-level abstraction of the objects perceived by the road user or by the plurality of road users, which may be easier to process in the prediction of the radio resources required for the communication of the plurality of road users.

In some embodiments, the environmental perception data may be obtained from the plurality of road users and from one or more road-side infrastructure entities. This may augment the environmental perception data, as environmental perception data of static entities, which may comprise better sensors, better processing capabilities, and/or which may be located advantageously, may be incorporated in the prediction of the required radio resources.

The method may further comprise determining information related to a signal phase and timing of a traffic light system at the intersection based on the information related to the plurality of planned maneuvers of the plurality of road users. The duplex resource scheme may be determined based on the information related to the signal phase and timing of the traffic light system. This may enable an integration between the systems that determine/provide the SPAT (Signal Phase and Timing Information) and the systems adapting the duplex resource scheme, enabling a higher degree of flexibility in the adaptation of both.

For example, the method may comprise determining intersection control information based on the information related to the plurality of planned maneuvers of the plurality of road users. The intersection control information may specify at least one of an order and a timing of the plurality of planned maneuvers of the plurality of road users at the intersection. The duplex resource scheme may be determined based on the intersection control information. Once the order and timing of the maneuvers at the intersections are known, the duplex resource scheme may be adjusted accordingly.

In some embodiments, the method is executed by a stationary entity of the mobile communication system. This may enable a centralized adaptation of the duplex resource scheme.

For example, the stationary entity may be co-located with a traffic-light system of the intersection. This may enable an integration of the determination of the duplex resource scheme with the provision of the signal phase and timing of the traffic light system.

In some other embodiments, the method is executed by a road user, e.g. a vehicle. This may enable a localized adaptation of the duplex resource scheme if the plurality of road users are out of coverage of a coverage area of base stations of the mobile communication system.

The method may comprise providing the duplex resource scheme to the plurality of road users using a control channel of the mobile communication system. This may enable the plurality of road users to adapt their communication based on the duplex resource scheme.

Embodiments further provide a method for a road user. The method comprises transmitting information related to a planned maneuver of the road user to a further road user or to a stationary entity of a mobile communication system. The planned maneuver is related to an intersection. The method further comprises receiving a duplex resource scheme for a localized communication in the mobile communication system from the further road user or from the stationary entity. The duplex resource scheme is based on the transmitted information related to the planned maneuver of the road user. The method further comprises performing the localized communication (e.g. by communicating in the mobile communication system) based on the duplex resource scheme. The duplex resource scheme may provide the radio resources required for a communication of (all) of the road users at the intersection.

Embodiments further provide a computer program having a program code for performing at least one of the methods, when the computer program is executed on a computer, a processor, or a programmable hardware component.

Embodiments further provide an apparatus for determining a duplex resource scheme for a localized communication in a mobile communication system. The apparatus comprises at least one interface for communicating with a plurality of road users. The apparatus comprises a control module configured to obtain information related to a plurality of planned maneuvers of the plurality of road users. The plurality of planned maneuvers are related to an intersection. The control module is configured to predict a plurality of radio resources required for a communication of the plurality of road users at the intersection based on the obtained information related to the plurality of planned maneuvers. The control module is configured to determine the duplex resource scheme based on the predicted plurality of radio resources required for the communication of the plurality of road users at the intersection.

Embodiments further provide an apparatus for a road user. The apparatuses comprises at least one interface for communicating with a further road user or to a stationary entity of a mobile communication system. The apparatus further comprises a control module configured to transmit information related to a planned maneuver of the road user to the further road user or to the stationary entity of the mobile communication system. The planned maneuver is related to an intersection. The control module is configured to receive a duplex resource scheme for a localized communication in the mobile communication system from the further road user or from the stationary entity. The duplex resource scheme is based on the transmitted information related to the planned maneuver of the road user. The control module is configured to communicate via the at least one interface (e.g. to perform the localized communication) based on the duplex resource scheme.

Embodiments further provide a further method, apparatus and computer program for a road user. The method comprises receiving a duplex resource scheme for a localized communication in a mobile communication system from a further road user or from a stationary entity. The duplex resource scheme is based on information related to a plurality of planned maneuvers of a plurality of road users. The method further comprises performing the localized communication (e.g. by communicating in the mobile communication system) based on the duplex resource scheme. The apparatus comprises at least one interface for communicating with a further road user or with a stationary entity of a mobile communication system. The apparatus comprises a control module, configured to receive a duplex resource scheme for a localized communication in a mobile communication system from the further road user or from the stationary entity via the at least one interface. The duplex resource scheme is based on information related to a plurality of planned maneuvers of a plurality of road users. The control module is configured to communicate in the mobile communication system via the at least one interface based on the duplex resource scheme.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
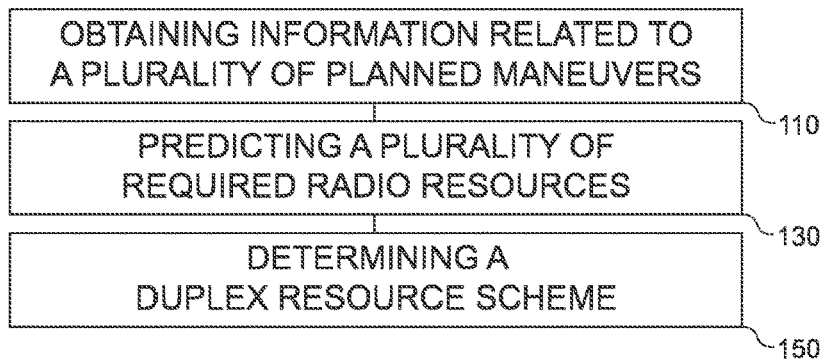
FIGS. 1a and 1b show flow charts of embodiments of a method for determining a duplex resource scheme for a localized communication in a mobile communication system.
Figure 1B:
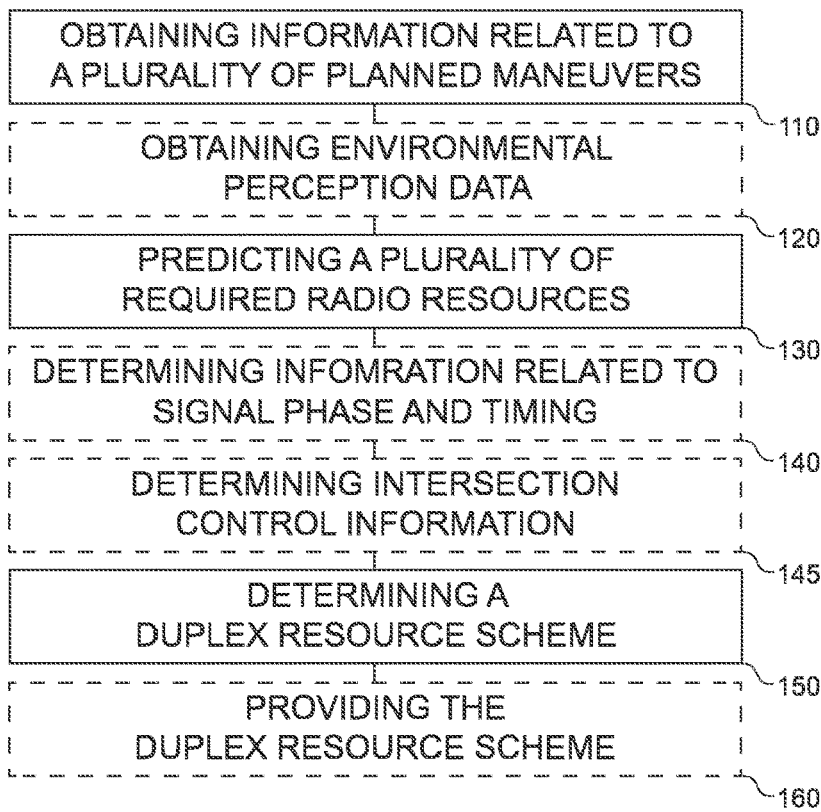

FIGS. 1a and 1b show flow charts of embodiments of a method (e.g. a computer-implemented method) for determining a duplex resource scheme for a localized communication in a mobile communication system. The method comprises obtaining 110 information related to a plurality of planned maneuvers of a plurality of road users. The plurality of planned maneuvers are related to an intersection. The method further comprises predicting 130 a plurality of radio resources required for a communication of the plurality of road users at the intersection based on the obtained information related to the plurality of planned maneuvers. The method further comprises determining 150 the duplex resource scheme based on the predicted plurality of radio resources required for the communication of the plurality of road users at the intersection.

Figure 1C:
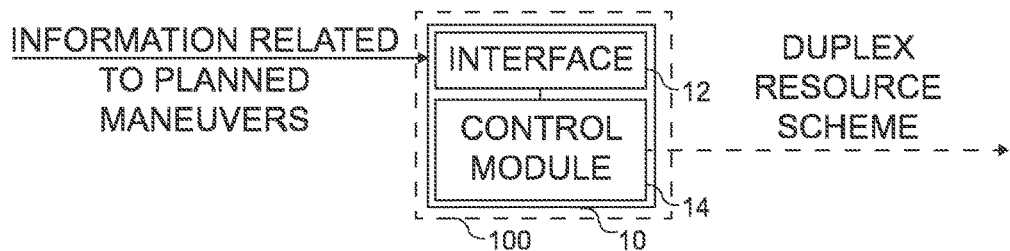
FIG. 1c shows a block diagram of an embodiment of an apparatus for determining a duplex resource scheme for a localized communication in a mobile communication system.

FIG. 1c shows a block diagram of an embodiment of a (corresponding) apparatus 10 for determining a duplex resource scheme for a localized communication in a mobile communication system. The apparatus 10 comprises at least one interface 12 for communicating with a plurality of road users. The apparatus 10 a control module 14, which is coupled to the at least one interface 12. The control module 14 may be configured to execute the method of FIGS. 1a and/or 1b, e.g. in conjunction with the at least one interface 12. The control module 14 is configured to obtain information related to a plurality of planned maneuvers of the plurality of road users. The plurality of planned maneuvers are related to an intersection. The control module is configured to predict a plurality of radio resources required for a communication of the plurality of road users at the intersection based on the obtained information related to the plurality of planned maneuvers. The control module is configured to determine the duplex resource scheme based on the predicted plurality of radio resources required for the communication of the plurality of road users at the intersection.

The following description relates to both the method of FIGS. 1a and/or 1b and the apparatus 10 of FIG. 1c.

Embodiments relate to a method and/or an apparatus for determining a duplex resource scheme for a localized communication in a mobile communication system. In at least some embodiments the method is used to improve an allocation of radio resources within the mobile communication system. In mobile communication systems, there usually is a scheduling of radio resources. For example, in a frame of the mobile communication system, a first portion of the frame may be dedicated to uplink communication (from the mobile transceiver, e.g. a vehicle, to a base station of the mobile communication system), a second portion of the frame may be dedicated to downlink communication (from the base station to the mobile transceiver), and, particularly in vehicular communication, a third portion of the frame may be dedicated to side-link communication (from a mobile transceiver to another mobile transceiver, without the direct communication traversing the base station). Based on these portions, a scheduler may assign the uplink, downlink and sidelink resources to the communication nodes of the mobile communication system. In some systems, the first, second and third portions may be statically allocated within the frame. In embodiments, this allocation is variable, and is based on the duplex resource scheme. The duplex resource scheme may control the allocation of radio resources between the first, second and third portions within the frame. In other words, the duplex resource scheme may control the allocation of radio resources between uplink resources, downlink resources and sidelink resources within a pre-defined time interval (e.g. within a frame) for the communication in the mobile communication system.

This duplex resource scheme may be determined at different points in the mobile communication system. In some cases, the method may be executed by a stationary entity 100 of the mobile communication system 300. Accordingly, the duplex resource scheme may be determined by the stationary entity of the mobile communication system. The stationary entity of the mobile communication system may e.g. be base station of the mobile communication system, e.g. an evolved Node B (eNodeB) or a gNodeB of the mobile communication system or another stationary component of the mobile communication system that is located either in the core network or in the radio access network of the mobile communication system. In at last some embodiments, the stationary entity may be co-located with a traffic-light system of the intersection, e.g. within or coupled to a control entity of the traffic-light system.

In other cases, the duplex resource scheme may be determined by a road user 100, e.g. a road user of the plurality of road users. In at least some embodiments, the plurality of road users may be connected road users (e.g. connected vehicles), i.e. autonomous road users (i.e. autonomous vehicles) or semi-autonomous road users (i.e. semi-autonomous vehicles) that are configured to communicate with other road users or with a backend server in order to make their driving decisions. In other words, the road user may be a connected vehicle, an autonomous vehicle or a semi-autonomous vehicle. For example, the plurality of road users or the further plurality of road users may be road users that are configured to coordinate their autonomous or semi-autonomous driving with other road users or with a backend server. In at least some embodiments, one of the plurality of vehicles may take on the task of providing the duplex resource scheme. For example, the road user may be a head vehicle of a vehicle cluster. In some embodiments, e.g. if the road user 100 is out of coverage of stationary base stations of the mobile communication system, the road user may take on the determining of the duplex resource scheme. In other words, the method may be executed by the road user, e.g. if the road user is out of coverage of the mobile communication system 300.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In at least some embodiments, the mobile communication system may be a vehicular communication system e.g. a vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, and $5^{th}$ generation mobile communication system V2X, 5G-V2X) mobile communication system. The mobile communication system may support two communication modes: PC5, which is used between road users, and Uu, which is used between road users and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. The direct vehicle-to-vehicle communication may be based on the same radio resources (e.g. the same frequency resources) as the communication via the base station of the road user. Consequently, there may be a joint planning of the radio resources for the direct vehicle-to-vehicle communication and for the communication via the base station.

Embodiments are focused on determining and using a duplex resource scheme. In embodiments, different radio resources may be duplexed, e.g. time resources, frequency resources, code resources and/or spatial resources. The duplex resources may be allotted between at least two of uplink communication, downlink communication, and side-link communication within the duplex resource scheme. In some cases, the duplex resource scheme may be or comprise a time duplex resource scheme. For example, the duplex resource scheme may comprise a dynamic time-division duplex (dynamic TDD) resource scheme. Within a dynamic TDD resource scheme, the time-slots within a frame may be dynamically (e.g. on a per-frame basis) allocated between uplink communication, downlink communication and (optionally) side-link communication. The duplex resource scheme may indicate or define a (dynamic) TDD frame structure.

In this context, side-link communication may be a direct communication between mobile terminals, e.g. vehicles, wherein the communication is performed directly between the mobile terminals, e.g. without the communication traversing a base station. In some cases, an allocation (e.g. scheduling) of the radio resources may be performed by a base station in side-link communication, but the communication itself might not involve the base station.

In various embodiments, the duplex resource scheme may comprise at least one of a frequency-division duplex resource scheme, a code duplex resource scheme, and a spatial resource scheme. In a frequency-division duplex resource scheme, the frequency resources may be dynamically (e.g. on a per-frame basis) allocated between uplink communication, downlink communication and (optionally) side-link communication. In a code duplex resource scheme, the code resources (i.e. codes of a plurality of concurrently valid codes) may be dynamically (e.g. on a per-frame basis) allocated between uplink communication, downlink communication and (optionally) side-link communication. In a spatial resource scheme, the spatial resources (e.g. using beam-forming for spatial separation) may be dynamically (e.g. on a per-frame basis) allocated between uplink communication, downlink communication and (optionally) sidelink communication.

In embodiments, the duplex resource scheme is valid for the localized communication in the mobile communication system. The localized communication may be communication that occurs in a pre-defined area, e.g. in a pre-defined area of or surrounding the intersection. For example, the localized communication may be vehicular communication, e.g. vehicle-to-vehicle or vehicle-to-network communication. In many cases, the pre-defined area (e.g. the intersection) may be covered by a base station of the mobile communication system. For example, the duplex resource scheme may be valid for a coverage area of a sector of a base station, for a coverage area of the entire base station, or for a coverage area of a plurality of interconnected base stations. Alternatively, the pre-defined area might be out of coverage of base stations of the mobile communication system (i.e. at least partially not within a coverage area of at least one of the base stations of the mobile communication system). In this case, the duplex resource scheme may be determined by a road user, and the localized communication may be among road users that obtain the duplex resource scheme from said road user. In this case, the pre-defined area may be a pre-defined area surrounding the road user or surrounding a cluster comprises the road user.

The method comprises obtaining 110 information related to a plurality of planned maneuvers of a plurality of road users, e.g. via the mobile communication system 300. The information related to the plurality of planned maneuvers may be transmitted by the plurality of road users. The information related to the plurality of planned maneuvers of the plurality of road users may indicate, which driving maneuvers (i.e. lane changes, turns, overtaking maneuvers etc.) the plurality of road users are planning to undertake (at the intersection). Accordingly, a planned driving maneuver of the plurality of planned driving maneuver may be an (imminent) driving maneuver that a road user of the plurality of road users is planning to execute within at most 30 s (or within at most 25 s, at most 20 s, at most 15 s, at most 10 s) (e.g. after obtaining the information related to the driving maneuver). If the method is executed by the road user, the method may comprise determining information related to a planned maneuver of the road user.

The plurality of planned maneuvers are related to the intersection. For example, the plurality of planned maneuvers may indicate, which driving maneuvers the plurality of road users are planning to undertake at the intersection, e.g. whether they are planning to go straight or whether they are planning to take a left or take a right.

The method comprises predicting 130 the plurality of radio resources required for a communication of the plurality of road users at the intersection based on the obtained information related to the plurality of planned maneuvers. For example, the plurality of radio resources required for the communication of the plurality of road users may be determined by predicting a plurality of communication links that are likely to be required between the plurality of road users (for vehicle-to-vehicle communication) and/or between the plurality of road users and a network (for vehicle-to-network communication) based on the plurality of planned maneuvers. If, for example, the plurality of planned maneuvers indicate that a road user of the plurality of road users desires to make a left turn, the road user is likely to communicate with at least some of the other road users that desire to move in a way that intersects with the left turn. Thus, communication links with these other road users may be predicted. Based on the predicted communication links, the plurality of radio resources required for the communication may be predicted, e.g. by using historical data to extrapolate the likely amount and distribution of radio resources required for the communication. In some other cases, the intersection may be hard to navigate for autonomous vehicles, e.g. because it is rather narrow at some point. In this case, if a road user desires to traverse the narrow point of the intersection, the road user may desire to be controlled by a tele-operated driving service. Thus, a communication link between the road user and the network may be predicted, and the plurality of radio resources required for the communication may be predicted, e.g. by using historical data to extrapolate the likely amount and distribution of radio resources required for the communication.

In at least some embodiments, the method further comprises obtaining 120 environmental perception data related to the plurality of road users. e.g. from the plurality of road users 200, from a plurality of road-side infrastructure entities or based on one or more perception sensors of a road user executing the method. The environmental perception data may be obtained via the mobile communication system 300. For example, the environmental perception data may comprise modeling information for an area surrounding the plurality of road users (and/or surrounding the plurality of road-side infrastructure entities), e.g. for an area surrounding the intersection. The environmental perception data may comprise information related to static objects, e.g. buildings, road signs, etc. and dynamic objects, e.g. pedestrians, cyclists, etc., around the road user/road users. This information may be generated by an environmental model perceived by the road user/road users and by infrastructure. Embodiments further provide an interface between an application layer of a road user and a media access control layer of a road user. If the environmental perception data is generated by the road user executing the method, the method may comprise determining the environmental perception data at an application layer of the road user, and providing the environmental perception data to the media access control layer of the road user, e.g. so the media access control layer determines the duplex resource scheme. If the environmental perception data is provided by the plurality of road users, the processing of the environmental perception data may be performed in the media access control layer, e.g. by packet inspection of packets received from the plurality of vehicles. The modeling information may relate to objects that have been identified by the road user or by the plurality of road users using one or more perception sensors of the plurality of the road user or of the road users (similar for road-side infrastructure entities). For example, the one or more perception sensors of the road users/road user/infrastructure entities may comprise at least one of a RADAR (Radio Detection and Ranging, in the following denoted "radar") sensor, a LI DAR (Light Detection and Ranging, in the following denoted "lidar") sensor, a camera sensor and an ultrasound sensor. The environmental perception data might not comprise the respective sensor data, but might correspond to a high-level abstraction of the sensor data of the one or more perception sensors of the road user or of the plurality of road users (and/or of the plurality of road-side infrastructure entities). For example, an environmental perception model of the environmental perception data may comprise information related to a position and/or of an extent of the objects that have been identified by the road user or the plurality of road users (and/or by the plurality of road-side infrastructure entities) using one or more perception sensors of the road user or the plurality of road users (and/or of the plurality of road-side infrastructure entities). In some embodiments, an environmental perception model of the environmental perception data may comprise information related to an identifier of the objects that have been identified by the road user or by the plurality of road users (and/or by the plurality of road-side infrastructure entities) using one or more perception sensors of the road user or the plurality of road users (and/or of the plurality of road-side infrastructure entities), e.g. if the objects are connected road users (i.e. if the objects are road users that communicate with the plurality of road users).

The plurality of radio resources required for the communication of the plurality of road users at the intersection may be predicted based on the environmental perception data of the plurality of road users. The prediction 130 of the plurality of radio resources required for the communication of the plurality of road users may comprise predicting a position and a movement of the plurality of road users (and of further road users located in the vicinity of the plurality of road users), e.g. at the intersection, based on the environmental perception data. The prediction of the position and movement of the further plurality of road users (or of the plurality of road users) may be used to determine traffic situations, which may in turn be used to predict the plurality of radio resources required for the communication of the plurality of road users. In other words, the obtained environmental perception data may be indicative of traffic situations, in which the plurality of road users are involved at the intersection. The traffic situations may correspond to traffic situations that involve more than one road user, i.e. traffic situations that require communication between connected road users (i.e. connected vehicles). For example, a traffic situation may be a situation that involves two or more road users, wherein the situation requires or benefits from a cooperation of the two or more road users. In these traffic situations, the plurality of road users may be predicted to communicate according to a previously known pattern. The previously known pattern may be based on previous communication in previous traffic situations, and may be used to predict the radio resources required for the communication of the plurality of road users. For example, if the obtained environmental perception data indicates, that a road users desires to make a left turn, a previously known communication pattern, that is derived from previous, similar situations, may be used to predict the plurality of radio resources required for the communication of the plurality of road users. In at least some embodiments, the environmental perception data may comprise a plurality of environmental perception models of the plurality of road users. Alternatively or additionally, the environmental perception data may comprise a combined environmental perception model for the pre-defined area (e.g. the intersection) based on the plurality of environmental perception models, wherein the plurality of environmental perception models are fused within the combined environmental perception model.

The method further comprises determining 150 the duplex resource scheme based on the predicted plurality of radio resources required for the communication of the plurality of road users. For example, the determining 150 of the duplex resource scheme may comprise determining, which of the duplex resources are to be used for uplink communication, downlink communication and (optionally) side-link communication. For example, the determining 150 of the duplex resource scheme may determine the duplex resource scheme such that the predicted plurality of radio resources required for the communication of the plurality of road users are satisfied by the duplex resource scheme. For example, the radio resources required for the communication of the plurality of road users may indicate an amount of radio resources required for uplink communication, an amount of radio resources required for downlink communication, and (optionally) an amount of radio resources required for downlink communication. The duplex resource scheme may be determined 150 such that the amount of radio resources required for uplink communication, the amount of radio resources required for downlink communication, and (optionally) the amount of radio resources required for downlink communication are sufficiently present within the duplex resource scheme. In some embodiments, road users about to enter an intersection may be prioritized in the determination of the duplex resource scheme, e.g. if not enough radio resources are available for all of the plurality of road users. The closer to the intersection, the higher the priority may be. In other words, the duplex resource scheme may be determined such, that the radio resources required for a communication of road users that are closer to the intersection are prioritized over the radio resource required for a communication of road users that are less close to the intersection. In some embodiments, e.g. if the method is executed by a road user, the method may further comprise coordinating or negotiating the duplex resource scheme with one or more further road users, e.g. via sidelink communication.

In at least some embodiments, the method comprises determining 140 information related to a signal phase and timing of a traffic light system at the intersection based on the information related to the plurality of planned maneuvers of the plurality of road users. The duplex resource scheme may be determined based on the information related to the signal phase and timing of the traffic light system. For example, the information related to the signal phase of timing may correspond to a Signal Phase And Timing (SPAT) message of the traffic light system. A SPAT message may be a message that is transmitted by the traffic light system to one or more road users in the vicinity of the traffic light system, e.g. to inform the one or more road users about a timing of changes in the signaling of the traffic light system. In embodiments, the information related to the signal phase and timing for the traffic light system may be determined in conjunction with the duplex resource scheme. For example, the information related to the signal phase and timing for the traffic light system may be determined based on the information related to the planned maneuvers of the plurality of road users, e.g. by timing the signal phases based on the planned maneuvers of the plurality of road users. Then, e.g. in a subsequent step or in parallel, the plurality of radio resources required for the communication (e.g. in a current signal phase or in a subsequent signal phase of the traffic light system) may be predicted, and the duplex resource scheme may be determined accordingly. For example, the duplex resource scheme may be determined per signal phase of the traffic light system.

Alternatively or additionally, the method may comprise determining 145 intersection control information based on the information related to the plurality of planned maneuvers of the plurality of road users. The intersection control information may be used to coordinate the plurality of planned maneuvers at the intersection. In other words, the intersection control information may comprise timing information for controlling specific vehicles/road users at the intersection. Accordingly, the method may comprise providing the intersection control information to the plurality of road users via the mobile communication system. For example, the method may comprise determining an order and/or a timing for the plurality of planned maneuvers of the plurality of road users at the intersection, e.g. using heuristics to determine an order and timing in which an overall required time is required. The intersection control information may be determined based on said order and/or a timing for the plurality of planned maneuvers of the plurality of road users at the intersection. In other words, the intersection control information may specify at least one of an order and a timing of the plurality of planned maneuvers of the plurality of road users at the intersection. The duplex resource scheme may be determined based on the intersection control information, e.g. by taking into account the order and/or the timing of the plurality of planned maneuvers. For example, the intersection control information may be determined by the entity executing the method, e.g. by a scheduler component of the entity executing the method. The requirements on receiving the intersection control information at planned timings at the vehicles/road users may be used for the pre-allocation of radio resources on the corresponding communication links between the road users and a base station providing the intersection control information.

In at least some embodiments, as further shown in FIG. 1b, the method comprises providing 160 (e.g. transmitting) the duplex resource scheme to the plurality of road users 200 using a control channel of the mobile communication system 300. For example, the control channel may be physical control channel of the mobile communication system, e.g. a physical downlink control channel (PDCCH), a physical uplink control channel (PUCCH) or a physical sidelink control channel (PSCCH) of the mobile communication system. The duplex resource scheme may be provided at a position within a slot of the control channel that is dedicated to providing the duplex resource scheme.

The at least one interface 12 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

More details and aspects of the method and/or apparatus 10 are mentioned in connection with the proposed concept or one or more examples described above or below (e.g. FIGS. 2a to 3). The method and/or apparatus 10 may comprise one or more additional optional features corresponding to one or more aspects of the proposed concept or one or more examples described above or below.

Figure 2A:
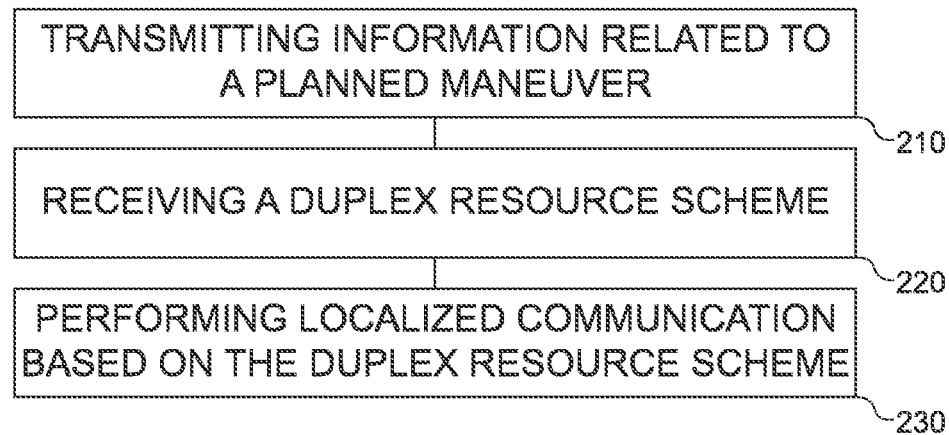
FIG. 2a shows a flow chart of an embodiment of a method for a road user, such as a vehicle.

FIG. 2a shows a flow chart of an embodiment of a method (e.g. a computer-implemented method) for a road user, such as a vehicle. The method comprises transmitting 210 information related to a planned maneuver of the road user to a further road user or to a stationary entity of a mobile communication system. The planned maneuver is related to an intersection. The method comprises receiving 220 a duplex resource scheme for a localized communication in the mobile communication system from the further road user or from the stationary entity. The duplex resource scheme is based on the transmitted information related to the planned maneuver of the road user. The method comprises performing 230 the localized communication (e.g. in the mobile communication system) based on the duplex resource scheme.

Figure 2B:
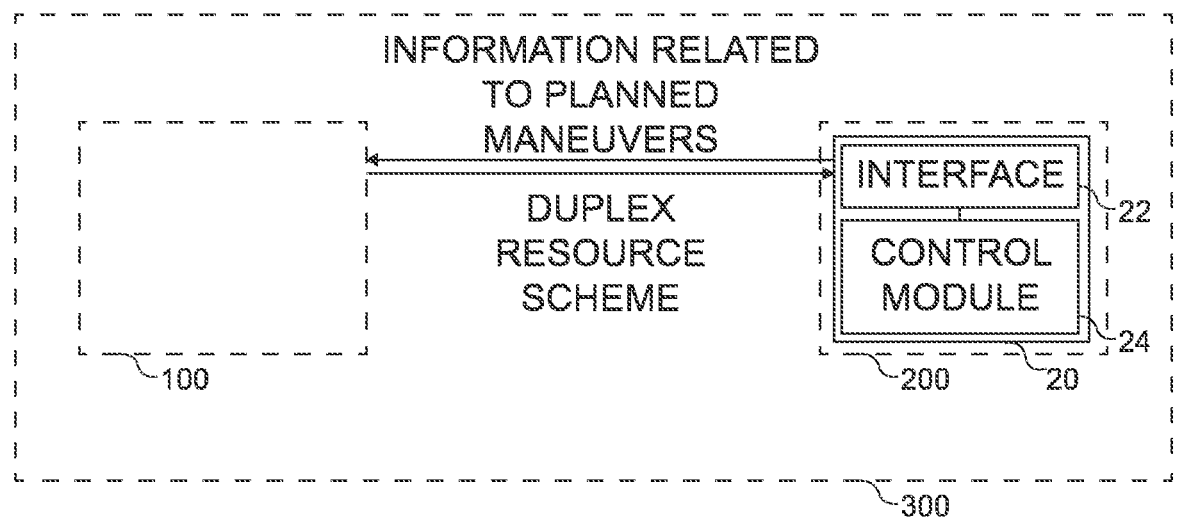
FIG. 2b shows a block diagram of an embodiment of an apparatus for a road user, such as a vehicle.

FIG. 2b shows a block diagram of an embodiment of a/an (corresponding) apparatus 20 for a road user 200, such as a vehicle. The apparatus 20 comprises at least one interface 22 for communicating with a further road user or to a stationary entity of a mobile communication system. The apparatus 20 comprises a control module 24, which is coupled to the at least one interface 22. The control module may be configured to execute the method of FIG. 2a, e.g. in conjunction with the at least one interface 22. For example, the control module 24 is configured to transmit information related to a planned maneuver of the road user to the further road user or to the stationary entity of the mobile communication system. The planned maneuver is related to an intersection. The control module is configured to receive a duplex resource scheme for a localized communication in the mobile communication system from the further road user or from the stationary entity. The duplex resource scheme is based on the transmitted information related to the planned maneuver of the road user. The control module is configured to communicate via the at least one interface 22 (e.g. in the mobile communication system, performing the localized communication) based on the duplex resource scheme.

The following description relates to both the method of FIG. 2a and the apparatus of FIG. 2b.

The method comprises transmitting 210 information related to a planned maneuver of the road user to a further road user or to a stationary entity of a mobile communication system (e.g. via the mobile communication system). The planned maneuver is related to the intersection. The method may comprise determining the information related to the planned maneuver, e.g. based on an autonomous or semi-autonomous driving algorithm of the road user.

In some embodiments, the method further comprises transmitting environmental perception data of the road user to the further road user or to the stationary entity of the mobile communication system. For example, the environmental perception data may comprise modeling information for an area surrounding the road user. The method may comprise determining the environmental perception data, e.g. based on perception sensor data of the road user. The environmental perception data may be determined on an application layer of a control module of the road user, e.g. by packet inspection and/or by content analysis of sensor data. The environmental perception data may comprise information related to the static, e.g. buildings, road signs, etc. and dynamic objects, e.g. pedestrians, cyclists, etc., around the road user/vehicle. The modeling information may relate to objects that have been identified by the road user using one or more perception sensors of the road user. For example, the one or more perception sensors of the road user may comprise at least one of a RADAR (Radio Detection and Ranging, in the following denoted "radar") sensor, a LI DAR (Light Detection and Ranging, in the following denoted "lidar") sensor, a camera sensor and an ultrasound sensor. The environmental perception data might not comprise the respective sensor data, but might correspond to a high-level abstraction of the sensor data of the one or more perception sensors of the road user. For example, the environmental perception data may comprise information related to a position and/or of an extent of the objects that have been identified by the road user using the one or more perception sensors of the plurality of road user. In some embodiments, the environmental perception data may comprise information related to an identifier of the objects that have been identified by the road user using the one or more perception sensors of the road user, e.g. if the objects are connected road users (i.e. if the objects are road users that communicate with the road user).

The method comprises receiving 220 a duplex resource scheme for a localized communication in the mobile communication system from the further road user or from the stationary entity, e.g. via a control channel of the mobile communication system. The duplex resource scheme is based on the transmitted information related to the planned maneuver of the road user. The duplex resource scheme may further be based on the transmitted environmental perception data.

The method comprises performing 230 the localized communication based on the duplex resource scheme. For example, the method may comprise choosing radio resources of the mobile communication system for the localized communication based on the duplex resource scheme.

The at least one interface 22 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

At least some embodiments are focused on how to deliver (specific) information to specific vehicles in an efficient manner (e.g. SPAT messages or remote control messages). Embodiments may be based on using a duplex resource scheme, e.g. dynamic TDD, to adapt the communication and traffic to the load scenario.

At least some embodiments are based on collecting environmental data (e.g. the environmental perception data) and traffic data (e.g. the information related to the plurality of planned maneuvers) and to determine a TDD frame structure based on the collected data. The concept of embodiments may be used both in an out of coverage and in an in-coverage scenario, e.g. by determining the duplex resource scheme at a stationary entity of the mobile communication system (if the plurality of road users are in coverage of a base station of the mobile communication system) and by determining the duplex resource scheme at a road user (if the plurality of road users are out of coverage). In the out of coverage scenario, the plurality of road users may transmit their MCM and/or CPM messages to a further vehicle, which acts as scheduler, and which determines the duplex resource scheme (e.g. the dynamic TDD frame structure) and provides the duplex resource scheme, e.g. along with the scheduling, to the specific vehicles. In the in-coverage scenario, the plurality of road users may transmit their MCM and/or CPM messages to a Mobile Edge Computing (MEC) entity (e.g. a stationary entity of the mobile communication system), which may control the strategy of a scheduler based on the obtained MCM/CPM messages. For example, the MEC entity may generate a control plan for the specific vehicles in the intersection area and determine the information and the timing it shall arrive at the vehicles. The scheduler may determine the duplex resource scheme (e.g. the dynamic TDD frame structure) based on the strategy and provide the duplex resource scheme, e.g. along with the scheduling, to the specific vehicles. The scheduler strategy may use the generated requirements of delivery of specific messages to specific vehicles on the intersection area to determine the duplex resource scheme (e.g. the dynamic TDD frame structure).

Figure 3:
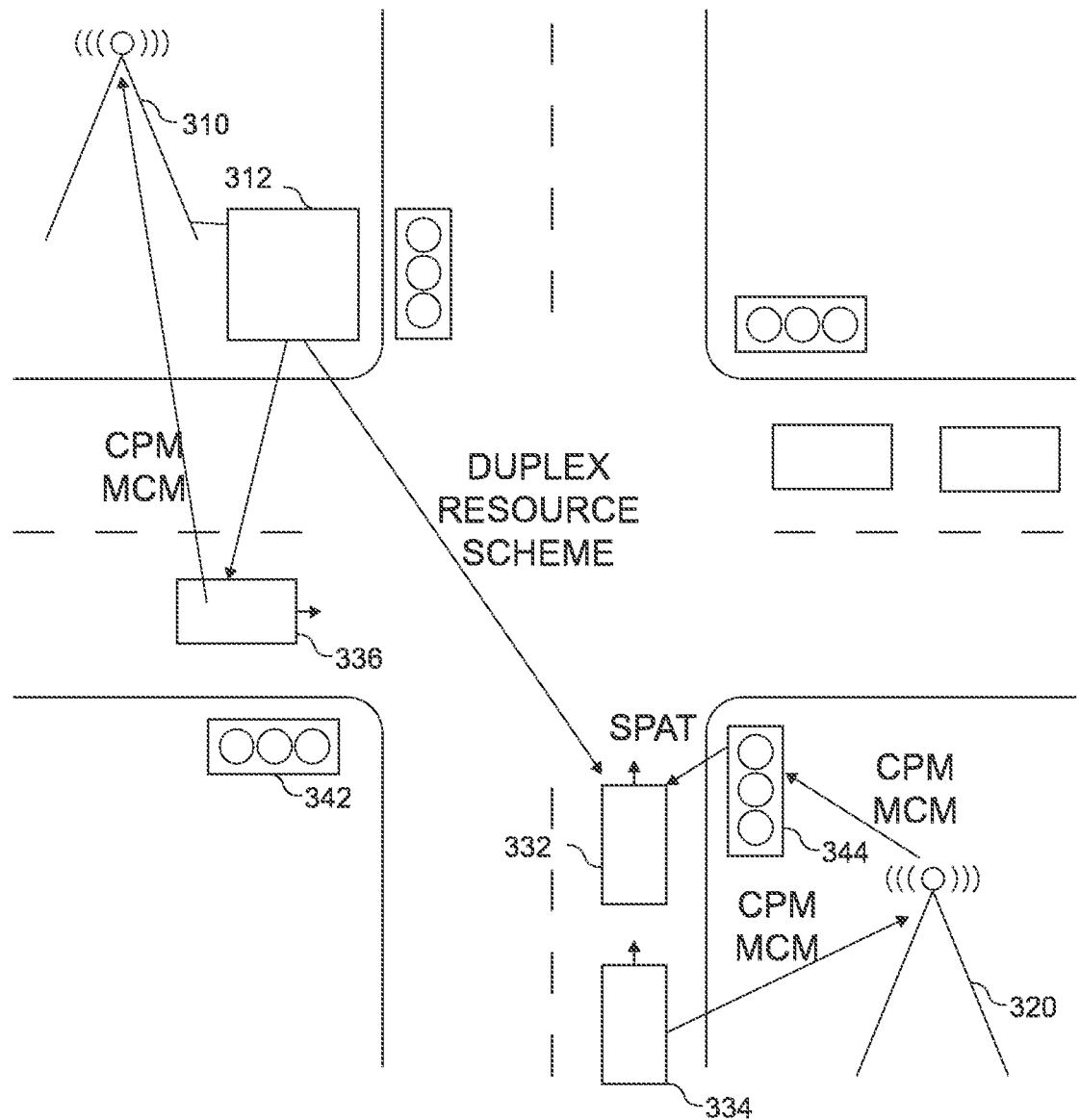
FIG. 3 shows a constellation of road users at an intersection.

FIG. 3 shows a constellation of road users at an intersection. In FIG. 3, a plurality of road users 332-336 are about to enter an intersection that is controlled by a traffic light system comprising traffic lights 342 and 344 (among others). In FIG. 3, the road users communicate with base stations 310; 320, e.g. by providing their Cooperative Perception Messages (CPM, e.g. the environmental perception data) and/or Maneuver Coordination Message (MCM, e.g. the information related to the planned maneuver) to the base stations. The base stations may provide the CPM/MCM messages to the traffic light system (e.g. base station 320 to traffic light 344), which may in turn transmit a SPAT message to the plurality of road users. Additionally, base station 310, a stationary entity of the mobile communication system, comprises a scheduler 312, which is configured to determine a duplex resource scheme based on the CPM and MCM messages, and which is configured to schedule the communication of the plurality of road users based on the duplex resource scheme, e.g. using the duplex resources as defined by the duplex resource scheme in the scheduling of the communication of the plurality of road users. In addition to this, the method of generating timing information to control specific vehicles on the intersection may be executed by the scheduler 312. The requirements on receiving the control signals at planned timings at the vehicles may be used for the pre-allocation of radio resources on the corresponding communication links between the base station 310 and vehicles 336 and 332/334.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 Apparatus
12 Interface
14 Control module
20 Apparatus
22 Interface
24 Control module
100 Road user or stationary entity
110 Obtaining information related to a plurality of planned maneuvers
120 Obtaining environmental perception data
130 Determining a plurality of radio resources required for a communication of a plurality of road users
140 Determining information related to a signal phase and timing
150 Determining a duplex resource scheme
160 Providing the duplex resource scheme
200 Plurality of road users
210 Transmitting information related to a planned maneuver
220 Receiving a duplex resource scheme
230 Performing a localized communication
300 Mobile communication system
310, 320 Base stations of a mobile communication system
312 Scheduler
332, 334, 336 Road users
342, 344 Traffic lights

What is claimed is:

1. A method executed by a stationary entity of a mobile communication system or a vehicle for determining a duplex resource scheme for a localized communication in the mobile communication system, the method comprising:
obtaining information related to a plurality of planned maneuvers of a plurality of vehicles, wherein the plurality of planned maneuvers are related to an intersection;
predicting an amount of radio resources required for a communication among the plurality of vehicles and/or between the plurality of vehicles and a network entity at the intersection based on the obtained information related to the plurality of planned maneuvers; and
determining the duplex resource scheme based on the predicted amount of radio resources required for the communication among the plurality of vehicles and/or between the plurality of vehicles and the network entity at the intersection.

2. The method according to claim 1, wherein the duplex resource scheme comprises a dynamic time-division duplex resource scheme.

3. The method according to claim 1, wherein the duplex resource scheme comprises at least one of a frequency-division duplex resource scheme, a code duplex resource scheme, and a spatial resource scheme.

4. The method according to claim 1, wherein duplex resources are allotted between at least two of uplink communication, downlink communication, and side-link communication within the duplex resource scheme.

5. The method according to claim 1, wherein the method further comprises obtaining environmental perception data related to the plurality of vehicles, wherein the amount of radio resources required for a communication of the plurality of vehicles at the intersection is predicted based on the environmental perception data related to the plurality of vehicles.

6. The method according to claim 5, wherein the environmental perception data comprises modeling information for an area surrounding the plurality of vehicles, wherein the modeling information relates to objects that have been identified by a vehicle executing the method or by the plurality of vehicles using one or more perception sensors of the vehicle or of the plurality of vehicles.

7. The method according to claim 5, wherein the environmental perception data is obtained from the plurality of vehicles and from one or more road-side infrastructure entities.

8. The method according to claim 1, wherein the method comprises determining information related to a signal phase and timing of a traffic light system at the intersection based on the information related to the plurality of planned maneuvers of the plurality of vehicles, wherein the duplex resource scheme is determined based on the information related to the signal phase and timing of the traffic light system.

9. The method according to claim 1, wherein the method comprises determining intersection control information based on the information related to the plurality of planned maneuvers of the plurality of vehicles, wherein the intersection control information specifies at least one of an order and a timing of the plurality of planned maneuvers of the plurality of vehicles at the intersection, wherein the duplex resource scheme is determined based on the intersection control information.

10. The method according to claim 1,
wherein the method is executed by the stationary network entity of the mobile communication system being co-located with a traffic-light system of the intersection.

11. The method according to claim 1, wherein the method comprises providing the duplex resource scheme to the plurality of vehicles using a control channel of the mobile communication system.

12. A method implemented by a vehicle for performing a localized communication, the method comprising:
transmitting information related to a planned maneuver of the vehicle to a further vehicle or to a stationary network entity of a mobile communication system, wherein the planned maneuver is related to an intersection;
receiving a duplex resource scheme for a localized communication in the mobile communication system from the further vehicle or from the stationary network entity, wherein the duplex resource scheme is determined based on an amount of resources required for a communication among a plurality of vehicles and/or between the plurality of vehicles and a network entity at the intersection, wherein the amount of resources is predicted based on the transmitted information related to the planned maneuver of the vehicle; and
performing the localized communication based on the duplex resource scheme.

13. An apparatus for determining a duplex resource scheme for a localized communication in a mobile communication system, the apparatus comprising:
at least one interface for communicating with a plurality of vehicles; and
a control module configured to:
obtain information related to a plurality of planned maneuvers of the plurality of vehicles, wherein the plurality of planned maneuvers are related to an intersection,
predict an amount of radio resources required for a communication among the plurality of vehicles and/or between the plurality of vehicles and a network entity at the intersection based on the obtained information related to the plurality of planned maneuvers, and
determine the duplex resource scheme based on the predicted amount of radio resources required for the communication among the plurality of vehicles and/or between the plurality of vehicles and the network entity at the intersection.

14. An apparatus for a vehicle, the apparatus comprising:
at least one interface for communicating with a further vehicle or to a stationary network entity of a mobile communication system; and
a control module configured to:
transmit information related to a planned maneuver of the vehicle to the further vehicle or to the stationary network entity of the mobile communication system, wherein the planned maneuver is related to an intersection,
receive a duplex resource scheme for a localized communication in the mobile communication system from the further vehicle or from the stationary network entity, wherein the duplex resource scheme is determined based on an amount of resources required for a communication among a plurality of vehicles and/or between the plurality of vehicles and a network entity at the intersection, wherein the amount of resources is predicted based on the transmitted information related to the planned maneuver of the vehicle, and
communicate via the at least one interface based on the duplex resource scheme.

15. A non-transitory, machine-readable storage medium including a program code for performing a method for determining a duplex resource scheme for a localized communication in a mobile communication system, when the program code is executed on a computer, a processor, or a programmable hardware component, the method comprising:
obtaining information related to a plurality of planned maneuvers of a plurality of vehicles, wherein the plurality of planned maneuvers are related to an intersection;
predicting an amount of radio resources required for a communication among the plurality of vehicles and/or between the plurality of vehicles and a network entity at the intersection based on the obtained information related to the plurality of planned maneuvers; and
determining the duplex resource scheme based on the predicted amount of radio resources required for the communication among the plurality of vehicles and/or between the plurality of vehicles and the network entity at the intersection.

16. A non-transitory, machine-readable storage medium including a program code for performing a method for a vehicle, when the program code is executed on a computer, a processor, or a programmable hardware component, the method comprising:
transmitting information related to a planned maneuver of the vehicle to a further vehicle or to a stationary network entity of a mobile communication system, wherein the planned maneuver is related to an intersection;
receiving a duplex resource scheme for a localized communication in the mobile communication system from the further vehicle or from the stationary network entity, wherein the duplex resource scheme is determined based on an amount of resources required for a communication among a plurality of vehicles and/or between the plurality of vehicles and a network entity at the intersection, wherein the amount of resources is predicted based on the transmitted information related to the planned maneuver of the vehicle; and performing the localized communication based on the duplex resource scheme.

* * * * *